United States Patent
Al-Mahshi et al.

(10) Patent No.: US 10,644,566 B2
(45) Date of Patent: May 5, 2020

(54) MOTOR WITH A MOTOR BRAKE

(71) Applicant: AKEBONO BRAKE INDUSTRY CO., LTD, Chuo-ku, Tokyo (JP)

(72) Inventors: Waleed Al-Mahshi, Farmington Hills, MI (US); Brian Boyle, Farmington Hills, MI (US)

(73) Assignee: AKEBONO BRAKE INDUSTRY CO., LTD, Chuo-ku, Tokyo (JP)

( * ) Notice: Subject to any disclaimer, the term of this patent is extended or adjusted under 35 U.S.C. 154(b) by 355 days.

(21) Appl. No.: 15/637,109

(22) Filed: Jun. 29, 2017

(65) Prior Publication Data

US 2018/0013332 A1 Jan. 11, 2018

Related U.S. Application Data

(60) Provisional application No. 62/359,910, filed on Jul. 8, 2016.

(51) Int. Cl.
*H02K 7/102* (2006.01)
*F16D 65/00* (2006.01)
(Continued)

(52) U.S. Cl.
CPC ....... *H02K 7/1023* (2013.01); *F16D 65/0068* (2013.01); *F16D 65/02* (2013.01);
(Continued)

(58) Field of Classification Search
CPC . H02K 7/1023; Y02E 10/725; F16D 65/0068; F16D 65/02; F16D 65/18;
(Continued)

(56) References Cited

U.S. PATENT DOCUMENTS 2,024,847 A 12/1935 Chambers
2,052,846 A 9/1936 Ryba
(Continued)

FOREIGN PATENT DOCUMENTS

EP 0851154 A2 7/1998

OTHER PUBLICATIONS

Potentially Related U.S. Appl. No. 62/408,904, filed Oct. 17, 2016.
(Continued)

*Primary Examiner* — Forrest M Phillips
(74) *Attorney, Agent, or Firm* — The Dobrusin Law Firm, P.C.

(57) ABSTRACT

A brake assembly comprising: (a) a caliper including: (i) one or more pistons, (b) one or more rotary to linear actuators that provides an axial force to move the one or more pistons, (c) a motor gear unit in communication with the one or more rotary to linear actuators, the motor gear unit including: (i) a motor, and (ii) a motor brake that prevents movement of the motor gear unit, the pistons, or both when the motor is turned off so that the brake apply is maintained, the motor brake including: (1) a rotor that is in communication with the motor, (2) a contact pad that is movable into contact with the rotor to prevent movement of the rotor and the motor, and (3) an electromagnet that is in communication with the contact pad and creates a brake retract.

20 Claims, 9 Drawing Sheets

(51) Int. Cl.
*F16D 65/02* (2006.01)
*F16D 65/22* (2006.01)
*F16D 65/18* (2006.01)
*F16D 121/18* (2012.01)
*F16D 125/36* (2012.01)
*F16D 129/08* (2012.01)
*F16D 127/06* (2012.01)

(52) U.S. Cl.
CPC ............. *F16D 65/18* (2013.01); *F16D 65/22* (2013.01); *F16D 2121/18* (2013.01); *F16D 2125/36* (2013.01); *F16D 2127/06* (2013.01); *F16D 2129/08* (2013.01); *Y02E 10/725* (2013.01)

(58) Field of Classification Search
CPC .. F16D 65/22; F16D 2121/18; F16D 2125/36; F16D 2129/08
USPC .............................................. 310/77; 188/185
See application file for complete search history.

(56) References Cited

U.S. PATENT DOCUMENTS

| | | | |
|---|---|---|---|
| 2,823,325 A | 2/1958 | Stephan | |
| 4,239,095 A | 12/1980 | De Jong | |
| 4,627,521 A * | 12/1986 | Takagaki | B60T 1/062 477/203 |
| 5,444,317 A * | 8/1995 | Anderson | H02K 7/1026 310/103 |
| 5,829,557 A * | 11/1998 | Halasy-Wimmer | B60T 13/741 188/162 |
| 5,920,136 A * | 7/1999 | Schmid | A61G 5/04 180/65.51 |
| 6,153,988 A * | 11/2000 | Reimann | F16D 65/18 188/162 |
| 6,988,595 B2 * | 1/2006 | Kamiya | B60T 13/741 188/158 |
| 7,108,110 B2 * | 9/2006 | Habele | F16D 49/00 188/156 |
| 2004/0004406 A1 * | 1/2004 | Zambelli | H02K 7/102 310/77 |
| 2011/0000751 A1 | 1/2011 | Carlson et al. | |
| 2012/0153754 A1 * | 6/2012 | Vincent | B66D 5/14 310/77 |

OTHER PUBLICATIONS

Potentially Related U.S. Appl. No. 62/374,236, filed Aug. 12, 2016.
Potentially Related U.S. Appl. No. 62/501,199, filed May 4, 2017.

* cited by examiner

MOTOR WITH A MOTOR BRAKE

FIELD

The present teachings generally relate to a motor brake for a motor and particularly to a high efficiency electric brake that includes an electromagnetic motor brake to prevent back drive of the motor and high efficiency electric brake when the parking brake is applied.

BACKGROUND

Vehicle brake systems typically have a service brake that has service brake apply modes and a parking brake system that has parking brake apply modes. During a service brake apply hydraulic pressure is applied to a piston that moves the piston. In recent systems, during a parking brake apply an electric motor and drive mechanism moves the piston to create the parking brake apply. Once the parking brake apply is complete the motor is turned off. Typically, worm gear or some other threaded member (e.g., lead screw) is located between the piston and the motor, which prevents the piston from back driving the mechanism and motor.

Examples of some brake assemblies may be found in U.S. Pat. Nos. 2,052,846; and 2,823,325 both of which are incorporated by reference herein for all purposes. It would be attractive to have a brake that prevents back drive of a motor when the motor is turned off. What is needed is motor brake that prevents back drive of the drive mechanism when the brake pads are compressed by a drive mechanism such as a high efficiency rotary to linear actuator (e.g., ball screw or ball ramp). What is needed is an electromagnetic motor brake that when activated releases the mechanism and when deactivated defaults to a locked position. It would be attractive to have a motor brake that is brake on when the electromagnet is not powered.

SUMMARY

The present teachings meet one or more of the present needs by providing: a motor comprising: (i) a motor shaft, and (ii) a motor brake that that is in communication with the motor shaft and prevents movement of the motor shaft when the motor is turned off so that movement of the motor shaft is prevented, the motor brake including: (1) a rotor that is in communication with the motor, (2) a contact pad that is movable into contact with the rotor to prevent movement of the rotor and the motor, and (3) an electromagnet that is in communication with the contact pad and creates a brake retract.

The present teachings meet one or more of the present needs by providing: a brake assembly comprising: (a) a caliper including: (i) one or more pistons, (b) one or more rotary to linear actuators that provides an axial force to move the one or more pistons, (c) a motor gear unit in communication with the one or more rotary to linear actuators, the motor gear unit including: (i) a motor, and (ii) a motor brake that prevents movement of the motor gear unit, the pistons, or both when the motor is turned off so that the brake apply is maintained, the motor brake including: (1) a rotor that is in communication with the motor, (2) a contact pad that is movable into contact with the rotor to prevent movement of the rotor and the motor, and (3) an electromagnet that is in communication with the contact pad and creates a brake retract.

The present teachings provide a brake that prevents back drive of a motor when the motor is turned off. The present teachings provide a motor brake that prevents back drive of the drive mechanism when the brake pads are compressed by a drive mechanism such as a high efficiency rotary to linear actuator (e.g., ball screw or ball ramp). The present teachings provide an electromagnetic motor brake that when activated releases the mechanism and when deactivated defaults to a locked position. The present teachings provide a motor brake that is brake on when the electromagnet is not powered.

BRIEF DESCRIPTION OF THE DRAWINGS

FIG. 5A is a top view of the motor brake with the brake on;

FIG. 9A is a top view of a motor brake with a brake on;

FIG. 11B is a top view of the motor brake of FIG. 11A with a brake on.

DETAILED DESCRIPTION

Figure 1:
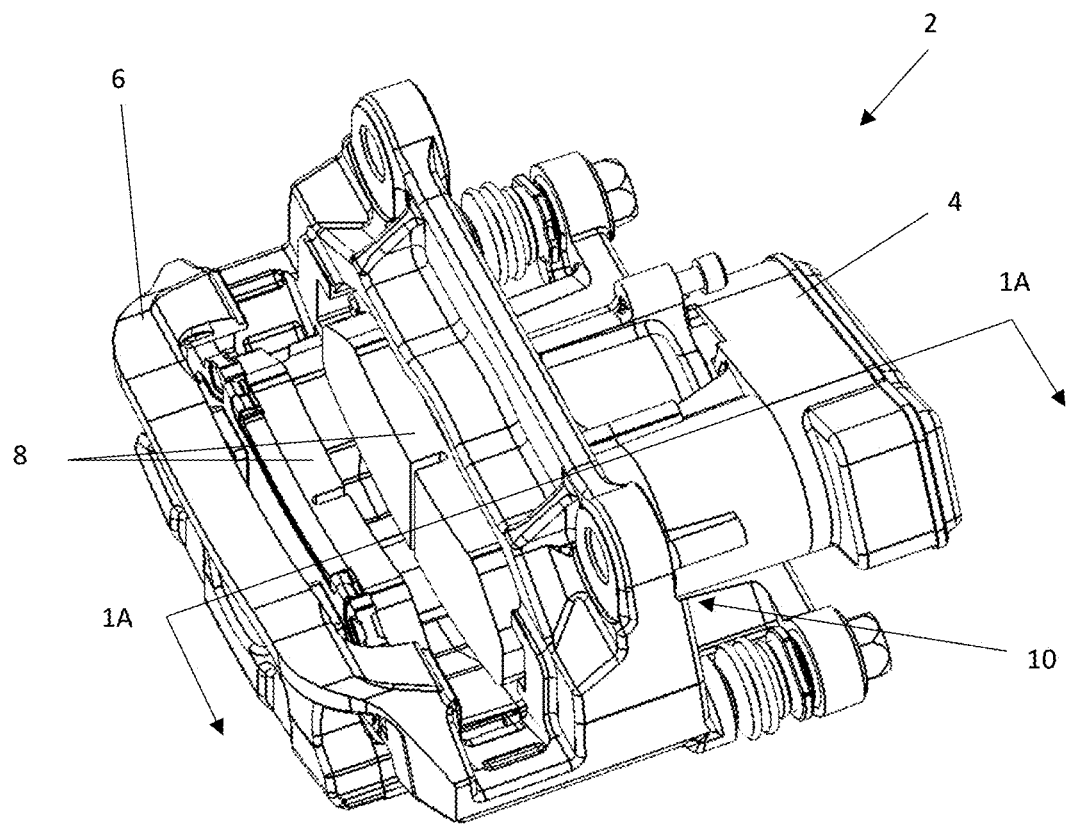
FIG. 1 is a perspective view of a brake assembly.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide a brake assembly including a motor with a motor brake and preferably an electromagnetic motor brake that maintains a parking brake apply. The brake assembly may be a floating caliper assembly, a fixed caliper assembly, a single piston assembly, a multi-piston assembly, a drum brake, or a combination thereof. Preferably, the brake assembly is a floating caliper or fixed caliper. The brake assembly may include a support bracket that connects a caliper to a machine (e.g., automobile, truck, wind turbine, paper machine). Preferably, the support bracket connects a caliper to a knuckle of a vehicle. The brake assembly may be free of a support bracket. The brake assembly be free of a caliper. The brake assembly may include one or more pistons, one or more piston bores, a plurality of pistons, a plurality of piston bores, or a combination thereof. The brake assembly may include hydraulic fluid under pressure that moves a piston axially into contact with a brake pad to create a brake apply. The hydraulic pressure in the piston bore may be released when the brake apply is complete so that an air gap is created and the piston retracts. The caliper may house the pistons, be connected to one or more motors, or a combination thereof that move brake pads or brake shoes to create a braking force.

The brake pads or brake shoes may function to contact a moving object and slow or stop the moving object. The brake pads or brake shoes function to create friction that stops or slows an object or maintains the object (such as a vehicle) at rest. The brake pads include friction material and a backing plate. The brake pads may be moved into contact with a rotor. The brake shoes may be moved into contact with a drum or a hat of a rotor. The brake pads or brake shoes may be moved axially by one or more pistons.

The one or more pistons function to axially move the one or more brake pads or brake shoes. The one or more piston may be hydraulically moved, mechanically moved, or both. The one or more pistons may be hydraulically moved during a service brake apply and mechanically moved during a parking brake apply. The one or more pistons may be made of metal or a phenolic. The one or more pistons may move along a piston bore in a caliper to create a service brake apply, a parking brake apply, or both.

The one or more calipers may function to assist in creating a brake apply. The one or more calipers may support one or more pistons so that the pistons may be moved to create a brake apply, a parking brake apply, or both. The calipers may axially move in an opposite direction to the pistons. The calipers may be static. The caliper includes one or more piston bores that each house a piston. The piston bores may include all or a portion of a rotary to linear actuator. The rotary to linear actuator may extend into the piston, which is located within the piston bore. The caliper may be connected to one or more motor gear units, one or more motors, or both.

The one or more motor gear units may each move one or more pistons, two or more pistons, four or more pistons, or even six or more pistons. The one or more motor gear units function to mechanically move a piston to create a parking brake apply. The motor gear unit may function to move a high efficiency rotary to linear actuator (e.g., ball ramp, or ball screw) to create a brake apply. High efficiency as discussed herein is rolling friction (e.g. a ball or cylinder). High efficiency as discussed herein is not sliding friction. The high efficiency rotary to linear actuator may be a high efficiency spindle. The motor gear unit may be a combination of a motor and gears. The gears may reduce the rotation speed of the motor or increase torque to create a parking brake apply. The motor gear unit may include one or more motors. The motor gear units may include a gear reduction assembly, a planetary gear assembly, gears that increase torque or speed, gears that decrease torque or speed, or a combination thereof. The one or more gears may be connected to one or more motor shafts that output torque to a piston, a rotary to linear actuator, a high efficiency device such as a rotary to linear actuator, or a combination thereof. The motor gear unit is in communication with one or more motors. Preferably, the motor gear unit includes one or more motors.

The one or more motors may function to apply torque when power is applied to the motors. The one or more motors may function to rotate one or more gears, a rotary to linear actuator, a ball screw, a lead screw, a gear, a differential, or a combination thereof. The one or more motors may function to create a parking brake apply. The one or more motors may be an electric motor. The one or more motors may include one or more abutment recesses.

The one or more abutment recesses function to receive a portion of a motor brake so that the motor brake is grounded to the motor. The one or more abutment recesses function to connect to abutment pins that assist in grounding all or a portion of the motor brake. The one or more abutment recesses are a cavity that an abutment pin extends into. The abutment recesses may be a projection that extends into an abutment pin. The motor may include one or more abutment recesses, two or more abutment recesses, three or more abutment recesses, or even four or more abutment recesses. The abutment recesses may be evenly spaced apart around the motor. The abutment recesses may be located around a motor shaft.

The one or more motor shafts may function to receive a braking force, apply torque, rotate a rotary to linear actuator, apply torque to a differential assembly, or a combination thereof. The one or more motor shafts may be located at a distal end of the motor, a proximal end of the motor, or both. The motor shafts may extend out of the motor and communicate a force to one or more components of a brake assembly to create a braking force, a parking brake force, a service braking force, or a combination thereof. The motor on one end may include a motor shaft that moves a piston and a second motor shaft that is in communication with a motor brake, a carrier, or both.

The one or more carriers may ground all or a portion of the motor brake. The one or more carriers may ground the motor, the motor brake, or both to a caliper, a brake, a support bracket, a support plate, motor gear unit, or a combination thereof. The carrier may function to ground a portion of the motor brake without grounding the motor brake to the motor. The carrier may include one or more through holes that all or a portion of the motor extend through to connect to the motor brake. Preferably, the motor includes a single motor brake and a motor shaft extends through the carrier into communication with the motor brake. The carrier may include one or more carrier recesses.

The one or more carrier recesses may function to ground all or a portion of a motor brake. The one or more carrier recesses may function to ground a contact pad. The one or more carrier recesses may receive one or more abutment pins. The one or more carrier recesses may be a hole that extends into the carrier. The one or more carrier recesses may be a projection that extends outward from the carrier. The one or more carrier recesses may be a through hole or a partial hole in the recess. The one or more carrier recesses may align with the one or more abutment recesses in the motor so that the abutment pins extend through the carrier into the motor. The one or more carrier recesses may be a recess on one side of the carrier and a projection on an opposing side of the carrier. For example, the projections may extend into the motor and the carrier recesses may receive the abutment pins. The carrier recesses may receive the abutment pins so that the contact pad of the motor brake is at least partially grounded.

The motor brake functions to brake the motor when the motor is off so that a brake apply is maintained. The motor brake functions to be a brake on a motor. The motor brake functions to maintain a set position of a motor so that the motor prevents brake pads or brake shoes from moving and releasing or relaxing a braking force. Preferably the motor brake is an electromagnetic motor brake. The electromagnetic motor brake may be released when the motor is turned on so that the motor brake does not provide a braking function. The electromagnetic motor brake may be applied when the motor is turned off so that the electromagnetic motor brake prevents rotation of the motor shaft, gear system, or both. The electromagnetic motor brake may be connected directly to the motor. The electromagnetic motor brake may be located within a housing.

The housing may function to protect the motor brake. The housing may function to prevent environmental materials from entering into the motor brake. The housing surrounds the motor brake and connects the motor brake to the motor, a carrier, or both. The housing may surround the motor and the motor brake. Preferably, the housing surrounds only the motor brake. The housing prevents fluids from coming into contact with the motor brake. The housing may be grounded to the motor and may ground the motor brake. Preferably, the housing moves with the motor and the housing acts as a rotor.

The one or more rotors may function to rotate with the motor. The one or more rotors may function to be connected to the motor and prevent movement of the motor when the motor is turned off. The one or more rotors may be connected to a motor shaft so that when the motor is off the rotor stops the motor from moving. The rotor may be axially or longitudinally static relative to the motor, the motor brake, or both. The rotor may be a solid piece of friction material (e.g., a material of a brake pad or a clutch plate), metal, plastic, or a both. The rotor may be made of any piece of material that is capable of being contacted by a contact pad and withstanding the contact over time so that continual motor braking is created. The rotor may withstand 1,000 or more contacts, preferably 10,000 contacts, more preferably 100,000 contacts, or even 1,000,000 or more contacts while maintaining a braking force so that the motor does not slip or move. The rotor may be in direct contact with a motor shaft. Preferably, the rotor includes a connection key that receives the motor shaft, the driver, or both. The connection key may be complementary in shape to the motor shaft. The connection key may receive the rotor so that the motor shaft rotates the rotor when the motor is on and so that the rotor prevents movement of the motor when the motor is off. The rotor may be a housing that houses all of the parts of the motor brake. The rotor (housing) may include a recess (i.e., housing recess) that receives all or portion of a contact pad, friction pads, or both. The housing (rotor) may surround the abutment pins, electromagnet, electrical coils, coil housing, concentrators, contact pad, springing portions, grounding portions, friction pads, or a combination thereof, wires, or a combination thereof.

The one or more housing recesses function to receive all or a portion of a contact pad, one or more friction pads, or both. The one or more housing recesses may function to house the electromagnet. The one or more housing recesses may function to receive the one or more friction pads. Preferably, the housing includes a plurality of housing recesses. More preferably, the housing includes the same number of housing recesses as friction pads. The one or more housing recesses may form a circular ring around the inside of the housing so that then the contact pad expands radially outward the contact pad contacts the one or more friction pads.

The one or more friction pads function to contact a springing portion to create a brake apply. The one or more friction pads function to prevent reversion or movement of a motor when the motor is off. The one or more friction pads function to prevent a rotor from rotating so that a motor is prevented from moving and ultimately brake pads are retained in the brake on position. The one or more friction pads may be made of the same material as a standard brake pad such as a resin, filler (e.g., organic and/or inorganic), abrasive (e.g., metal or ceramic), lubricant (e.g., graphite or carbon), or a combination thereof. The one or more friction pads may be a singular annular friction pad. The one or more friction pads may be a plurality of discrete friction pads that are complementary in shape to the rotor and together form a generally annular shape.

The electromagnetic motor brake may include one or more of each of the following items: wires, an electrical coil, an electromagnet, a friction pads, a rotor, contact pad, a abutment pins, coil housing, or concentrator. The electromagnetic motor brake may include an electromagnet that includes one or more concentrators, electrical coils, electrical coils, legs, caps, or a combination thereof. The one or more electromagnets function to move one or more portions of the contact pad away from the rotor so that the rotor rotates and the motor creates a brake apply or releases a brake apply. The electromagnets may pull two parts of the contact pad together. The electromagnets may push two parts of the contact pad apart. The electromagnet may pull on the contact pad to create a brake release. The electromagnet may push on the contact pad to create a brake release. The electromagnet when activated may bias inward moving the contact pad out of contact with the rotor creating a brake release. The electromagnet may include a plurality of electrical coils that are in contact with a coil housing. The electromagnet may be suspended from the motor, the carrier, or both. The electromagnet may be located between the springing portion, the grounding portion, or both. The electromagnet may be located between two halves of the contact pad. The electromagnet may be in contact with two halves of the contact pad. The electromagnets may have a sufficient force to overcome a springing force of the contact pad. The electromagnet may be powered by one or more wires, the motor, a wire extending from the motor, or a combination thereof. The electromagnets may overcome a springing force so that a gap is created between the contact pad and friction pads. The one or more electromagnets may include one or more electrical coils.

The one or more electrical coils function to move one or more portions of the contact pad when the electrical coils are activated. The one or more electrical coils may function to release the motor brake. The one or more electrical coils may cooperate with the one or more concentrators to create a magnetic field. The one or more electrical coils may create a magnetic field when the electrical coils are powered. The electrical coils may be copper wired. The electrical coils may be wound around a coil housing. Preferably, the electrical coils are a single piece of material that is wrapped multiple times around a coil housing.

The one or more coil housings function to support the electrical coils. The one or more coil housings function to connect the electrical coils within the motor brake, the concentrators, or both. The one or more coil housings may be a bobbin that the electrical coils are wrapped around. The one or more coil housings may be a linear piece that the electrical coils are wrapped around. The one or more coil housings may be a circular piece that the coil housing is wrapped around. The one or more coil housings may be "H" shaped and the electrical coils may be wrapped around the cross bar. The one or more coil housing may be partially surrounded by a cap, a concentrator, or both. The one or more coil housings may direct the magnetic field in a specific direction. The one or more coil housings may concentrate the magnetic field. The one or one or more coil housings may be complementary to the concentrators in modifying the magnetic field. The one or more coil housings may concentrate the electromagnetic field, direct the electromagnetic field, amplify the electromagnetic field, or a combination thereof. The one or more coil housings and electrical coils may fit within a cap, a concentrator, or both.

The one or more caps may align the coil housing, the electrical coil, or both within the concentrator. The one or more caps may lock a portion of the coil housing, the electrical coils, or both within a concentrator. The one or more caps may prevent the coil housing, the electrical coils, or both from being removed from the concentrators but allowing the concentrators to move relative to the coil housing, the electrical coils, or both. The one or more caps may seal the electrical coils within the concentrator. The one or more caps may close the concentrator.

The concentrators may function to amplify a magnetic field, concentrate a magnetic field, or both. The one or more concentrators may direct a magnetic field in a specific direction. The one or more concentrators may surround all or a portion of the electrical coils, the coil housing, or both and a move when the electrical coils are activated. The concentrators may work with the one or more coil housings to concentrate the magnetic field so that the magnetic field moves one or more parts of the contact pad. The concentrators may be grounded to the housing. Preferably, the concentrators are connected to or in communication with a contact pad. The one or more concentrators may be a magnetic material. Preferably, the one or more concentrators may be made of metal or include metal (e.g., iron, nickel, cobalt). The one or more concentrators may be static. The concentrators may move with the contact pad when the contact pad moves into a brake on position. The one or more concentrators may move the contact pad when electrical coils are powered. The one or more concentrators may move with the contact pad when the contact pad moves from a brake release to a brake on position. The one or more concentrators may include one or more legs.

The one or more legs may extend from each concentrators. The one or more legs may function to move the contact pad. The legs may be an integral part of the concentrators. The one or more legs may move the concentrators with the contact pad when the contact pad moves from a brake off position to a brake on position. The one or more legs may extend into one or more holes in the contact pad so that the concentrators are connected to the contact pad. The one or more legs may assist the electromagnet in moving the contact pad from a brake on position to a retracted position. The one or more legs may extend into a pad aperture.

The one or more pad apertures in the contact pad may function to maintain the location of the concentrators relative to the contact pads. The one or more pad apertures may receive a portion of the legs of the concentrators. The one or more pad apertures may entirely receive the legs so that the concentrators move with the contact pad and vice versa. The one or more pad apertures may connect to the legs so that when the springing portion of the contact pad move from a brake release to a brake on the concentrator moves with the contact pad. The one or more legs may be connected to the one or more pad apertures in the contact pad to overcome a force of the springing portion to move the contact pad from the brake on position to a brake release.

The one or more contact pads may function to create a brake apply. The one or more contact pads function to move radially outward into contact with one or more friction pads to prevent movement of the rotor, keep the motor static, or both. The one or more contact pads may be a generally circular in shape. The one or more contact pads be generally "U" shaped. The one or more contact pads may include a slit that extends generally down a center of the contact pad to allow for parts of the contact pad to move relative to each other. The one or more contact pads may be a formed band. The one or more contact pads may expand radially outward. The one or more contact pads may be decreased radially inward. The one or more contact pads may be rotatable about an axis. The one or more contact pads may rotate about an axis of a pin, an abutment pin, or both. The one or more contact pads may be radially movable about a grounding portion so that the contact pad moves to create a brake apply, a brake release, or both. The one or more contact pads may have a width that extends parallel to the axis of rotation of the motor. The one or more contact pads may have a portion that is perpendicular to the axis of rotation of the motor. The one or more contact pads may have a portion is parallel to and a portion that is perpendicular to the axis of rotation of the motor. The one or more contact pads may include one or more springing portions, one or more grounding portions, one or more moving tabs, one or more contact portions, or a combination thereof.

The one or more contact portions function to contact a rotor, a friction pad, or both. The one or more contact portions function to prevent movement of the rotor. The one or more contact portions may be a portion of the contact pad that extends into contact with the rotor, the friction pad, or both. The one or more contact portions may be generally circular. The one or more contact portions may create a full circle. The one or more contact portions may extend so that the contact portions contact about 360 degrees or less, about 300 degrees or less, about 270 degrees or less, about 225 degrees or less, or about 180 degrees or less of the rotor, contact pad, or both. The one or more contact portions may contact about 90 degrees or more, about 135 degrees or more, or about 170 degrees or more of the rotor, friction pad, or both. The contact portions may be separated into two or more portions, three or more portions, or even four or more portions. The contact portions may be a main part of the contact pad. The contact portions may extend at an angle relative to the main part. The one or more contact portions may be metal to metal contact with the rotor. The one or more contact portions ay include friction material. The one or more contact portions may be free of friction material. The one or more contact portions may contact the one or more friction pads. The contact portions may contact a plurality of friction pads. The contact portions may extend from the springing portions, the grounding portions, or both.

The one or more springing portions may function to move the contact pad into contact with one or more friction pads. The one or more springing portions may function to radially expand the contact pad outward. The one or more springing portions may create an outward force. The one or more springing portions may be in tension during a brake release. The one or more springing portions may be compression during a brake release. The one or more springing portions may create a brake on when the electromagnet is off. The one or more springing portions may be at rest when the contact pad is in contact with the friction pads. The one or more springing portions may be an arc in the contact pad. The one or more springing portion that may flex the contact pad so that a bias force is created. The one or more springing portions may create a force that is sufficiently large to prevent movement of the motor when the motor is off, sufficiently large to overcome back drive of the one or more pistons when the motor is off, or both. The one or more springing portions may contact a grounding portion, an abutment pin, or both to create a force. The one or more springing portions may expand outward by biasing off of one or more abutment pins, a grounding portion, or both.

The one or more grounding portions may function to ground a portion of the contact pad from moving, retaining the contact pad generally in a center of the rotor, or both. The one or more grounding portions may connect the contact pad to the motor, the carrier, or both. The one or more grounding portions may be connected to the carrier. The carrier may be located between the motor and the motor brake. The carrier may connect the contact pad to the motor. The carrier may connect the contact pad to the caliper. The one or more grounding portions may prevent a portion of the contact pad from moving. The one or more grounding portions may create a pivot point for the springing portions. The one or more grounding portions may be a closed shape that an aperture pin extends through. The one or more grounding portions may prevent rotation of the contact pad. The one or more grounding portions may pivot about an abutment pin. The contact pad may include two grounding portions. When two grounding portions are present the two grounding portions may be located opposite each other. The one or more grounding portions may be free of movement relative to the abutment pin. The one or more grounding portions may connect to one or more abutment pins. The one or more grounding portions may be in contact with a springing portion a moving tab or both. The one or more grounding portions may create a pivot point for a moving tab or a springing portion to push off. The one or more springing portions may include one or more moving tabs.

The one or more moving tabs may function to carry the electromagnet. The one or more moving tabs may function to allow the electromagnet to overcome the springing force. The one or more moving tabs may function to create a brake release. The one or more moving tabs may be pushed by the electromagnet. The one or more moving tabs may be pulled by the electromagnet. An electromagnet may be located between the moving tab and the grounding portion, an abutment pin, or both. The one or more moving tabs may assist in moving the contact pad radially inward, away from the friction pad, or both. The one or more moving tabs may be located proximate to a pad recess.

The one or more pad recesses may function to receive an abutment pin. The one or more pad recesses may receive an abutment pin to ground the contact pad.

During a brake retract a gap may be created between the contact pad and the rotor of the friction pad. The gap may be located between the contact portion of the contact pad and the rotor, the friction pad, or both. The gap may be sufficiently large so that the rotor rotates relative to the contact pad. The gap may be about 0.001 mm or more, about 0.002 mm or more, or about 0.005 mm or more. The gap may be about 0.5 mm or less, about 0.02 or less, or about 0.1 mm or less. The gap may be sufficiently large that when the rotor rotates relative to the contact pad.

The electromagnet may move the contact pad so that a gap is created between portions of electromagnet and a rake apply is created.

FIG. 1 illustrates a brake assembly 2. The brake assembly 2 includes a motor gear unit 4 and a caliper 6. The caliper 6 has a pair of opposing brake pads 8 that are moved by a piston (not shown) sliding inside a piston bore (not shown) within the caliper 6. During hydraulic operation the piston movement is caused by hydraulic pressure and during an electric brake apply by the motor gear unit 4 and a rotary to linear actuator (not shown).

Figure 1A:
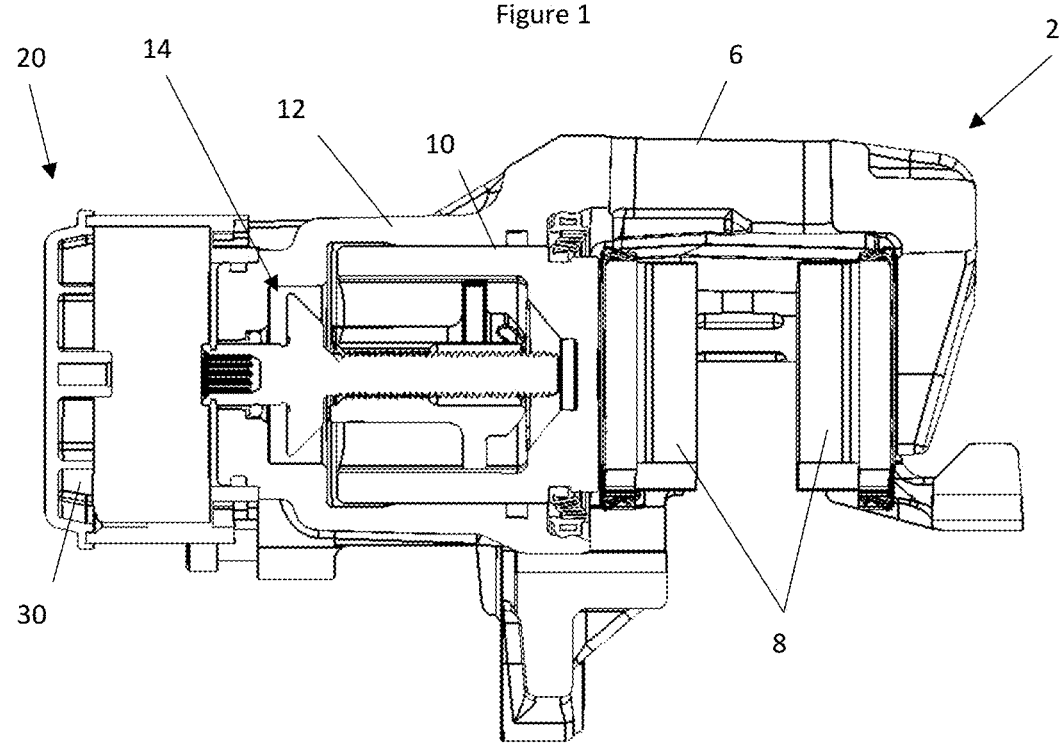
FIG. 1A is a cross-sectional view of the brake assembly of FIG. 1.

FIG. 1A is a cross-sectional view of the brake assembly 2 of FIG. 1. The brake assembly 2 includes a caliper 6 with a pair of opposing brake pads 8. One of the brake pads 8 is in contact with a piston 10. The piston 10 is located within a piston bore 12. The piston bore 12 includes hydraulic fluid (not shown) that moves the piston 10 when fluid pressure is increased, and a rotary to linear actuator 14 that electrically moves the piston 10 when the motor 20 is turned on. The motor 20 includes an electromagnetic brake 30.

Figure 2:
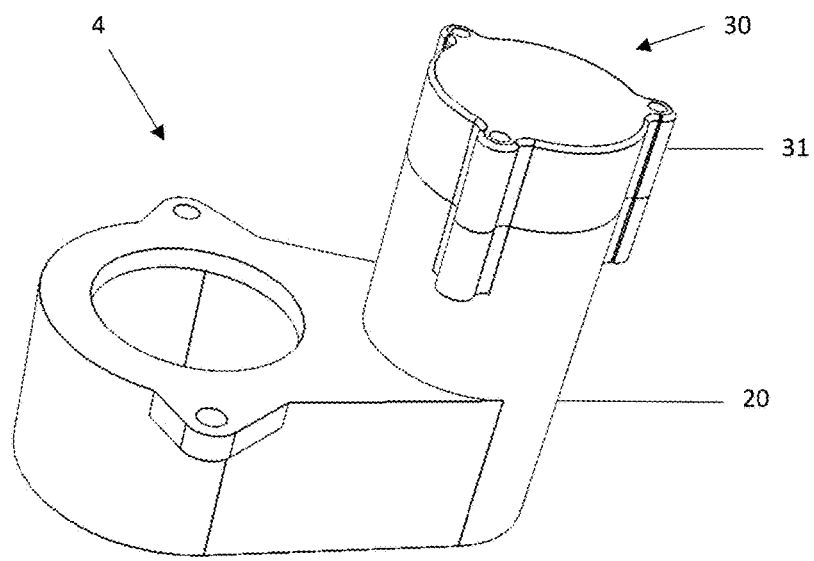
FIG. 2 is a perspective view of a motor gear unit.

FIG. 2 illustrates a motor gear unit 4. The motor gear unit 4 includes a motor 20 and an electromagnetic brake 30 with a housing 31.

Figure 3:
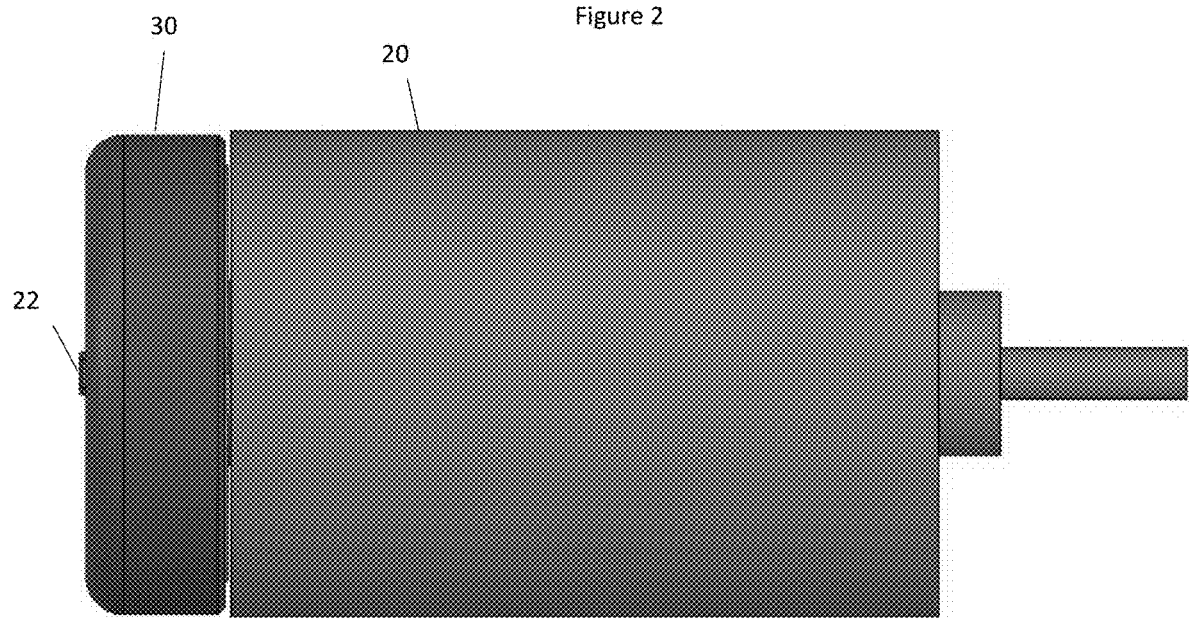
FIG. 3 is a side view of a motor and a motor brake.

FIG. 3 is a side view of a motor 20 connected to a motor brake 30. The motor 30 includes a motor shaft 22 that extends through the motor brake 30.

Figure 4:
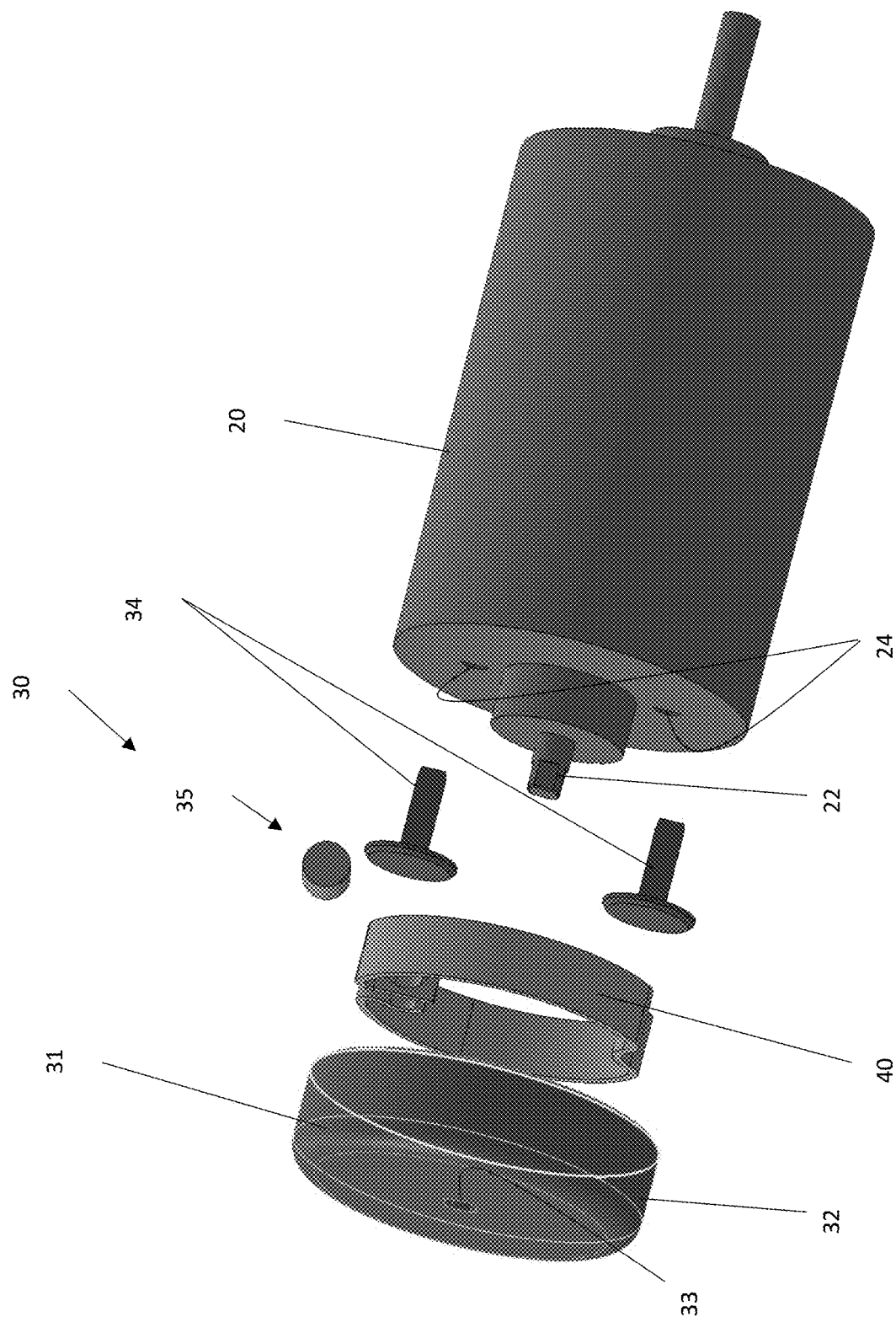
FIG. 4 is an exploded view of the motor and motor brake of FIG. 3.

FIG. 4 illustrates a motor 20 with an exploded view of a motor brake 30. The motor brake 30 includes a housing 31 that is also a rotor 32. The rotor 32 is connected to the motor shaft 22 and the motor shaft 22 rotates the rotor 32. Inside of the housing 31 is a contact pad 40 that is connected to abutment recesses 24 in the motor 20 by abutment pins 35 so that the contact pad 40 is grounded to the motor 20. The contact pad 40 includes an electromagnet 35 that moves the contact pad 40.

Figure 5A:
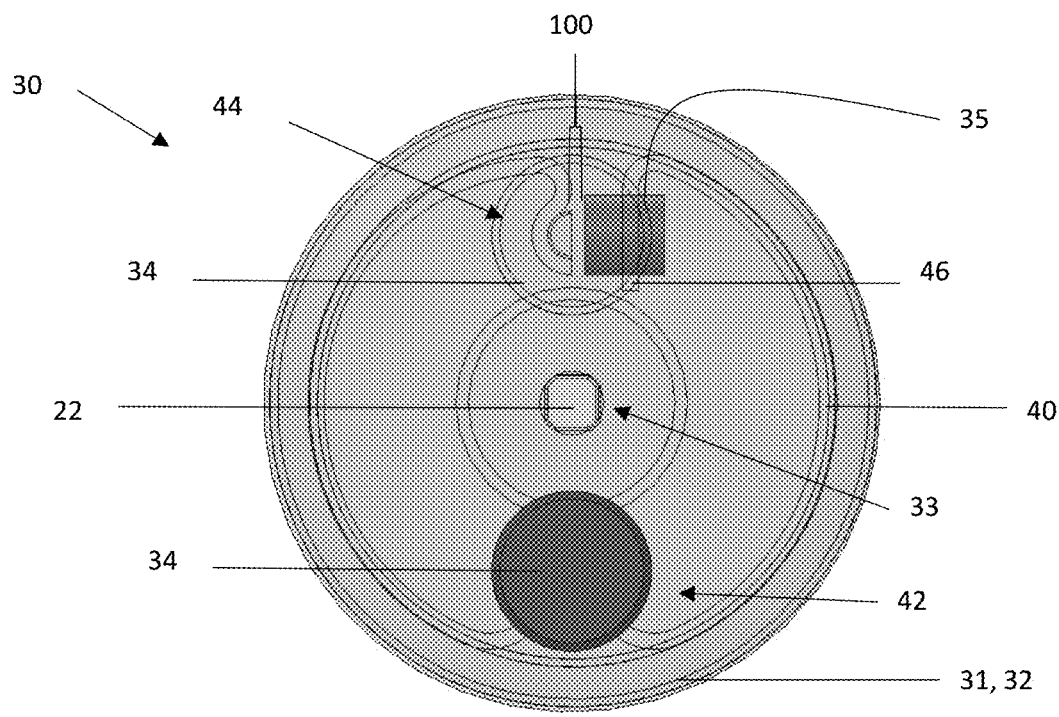

FIG. 5A illustrate a top view of a motor brake 30 when the motor brake 30 is brake on so that the contact pad 40 is in contact with the housing 31 which is also the rotor 32 (shown in transparent). As shown, the contact pad 40 includes a springing portion 42 that biases the contact pad 40 radially outward into contact with the rotor 32, which is rotated by the motor shaft 22, which fits within and is keyed to a connection key 33 within the rotor 32. The contact pad 40 also includes a grounded portion 44 that is connected to a motor (not shown) by an abutment pin 34. An electromagnet 35 is connected to a moving tab 46, which is moved outward by the springing portion 42 so that a gap is created between the moving tab 46 and the grounding portion 44.

Figure 5B:
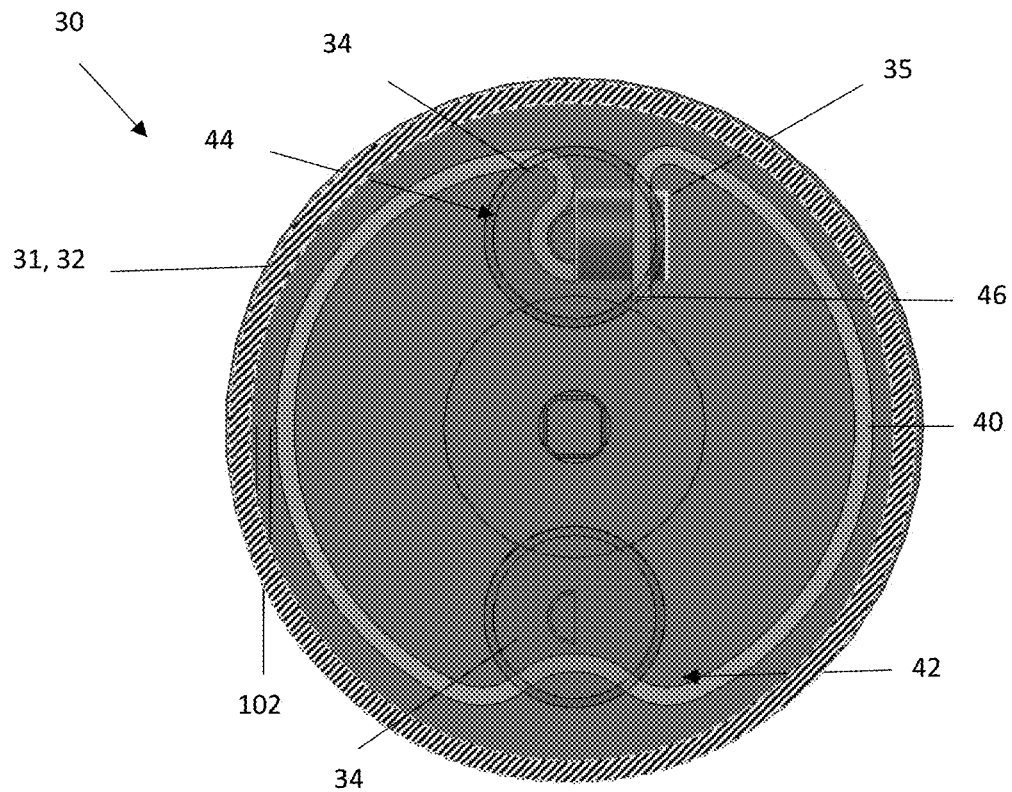
FIG. 5B is a top view of the motor brake of FIG. 6 with a brake release.

FIG. 5B illustrates a top view of a motor brake 30 when the motor brake 30 is brake release so that a gap 102 is located between the contact pad 40 and the rotor 32/housing 31 (shown as a ring). The electromagnet 35 is energized and the electromagnet 35 moves the moving tab 46 towards the grounding portion 44 so that the contact pad 40 is compressed and the gap 102 is created such that the rotor 32 rotates with the motor. The abutment pins 34 connect the contact pad 40 the motor (not shown) at the grounding portion 44 and the springing portion 42.

Figure 6:
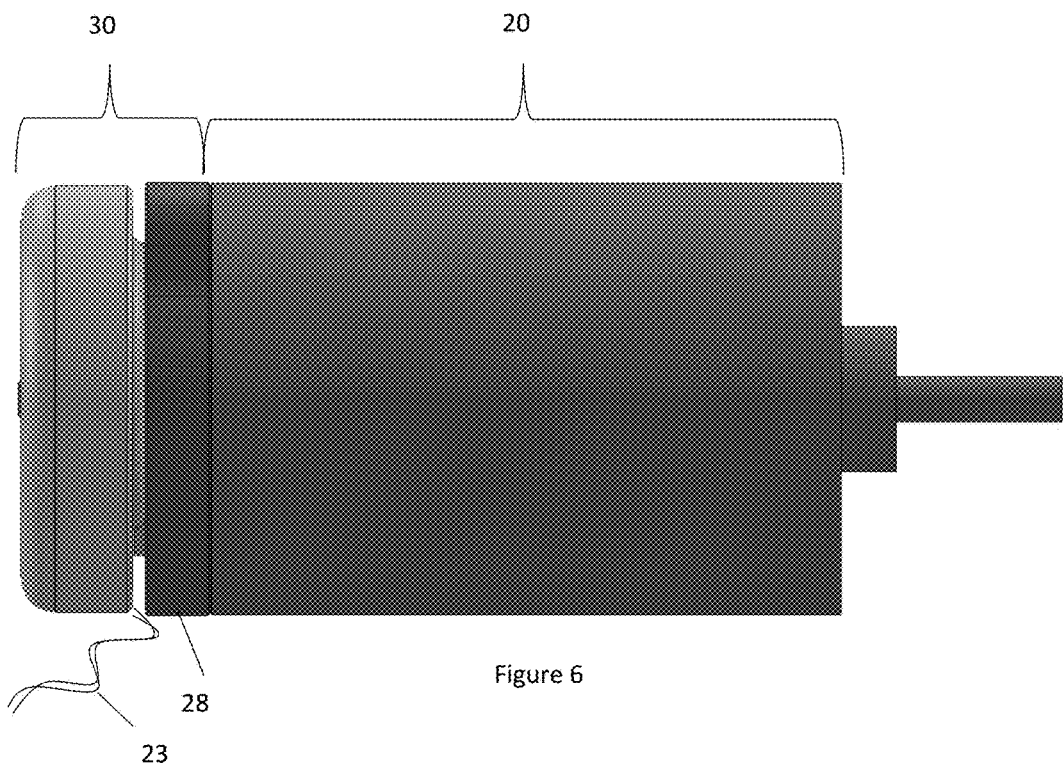
FIG. 6 is a side view of a motor and motor brake.

FIG. 6 illustrates a side view of a motor 20 connected to a motor brake 30. A carrier 28 is located between the motor 20 and the motor brake 30. A wire 23 extends into the motor 20 to power the motor 20.

Figure 7:
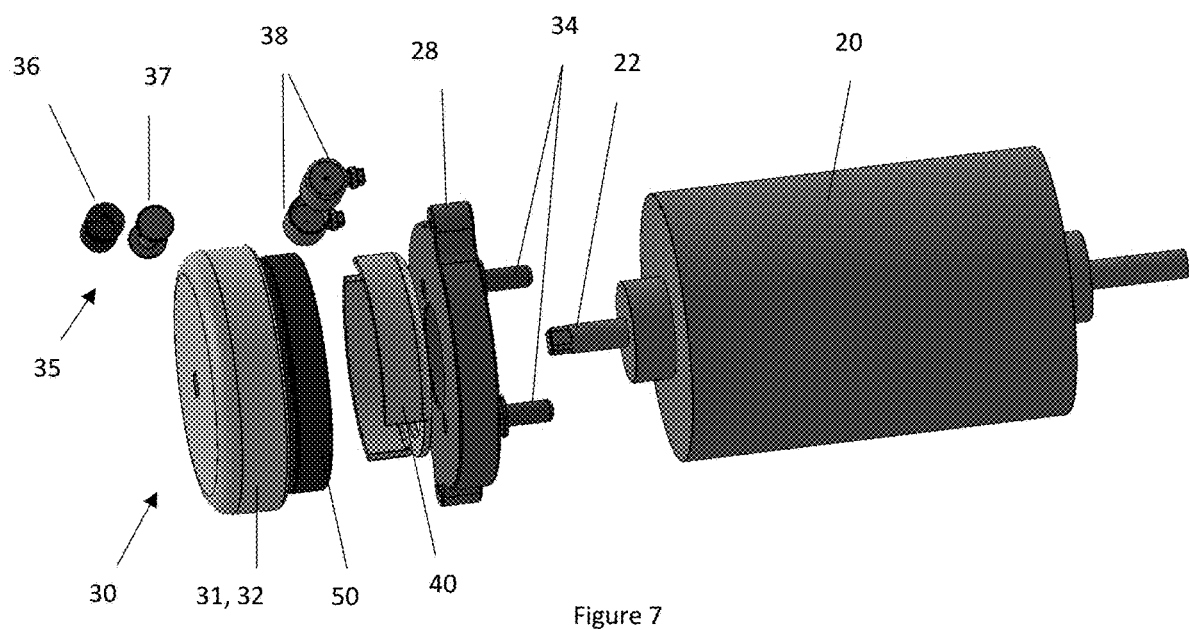
FIG. 7 is an exploded view of the motor brake in line with the motor.

FIG. 7 illustrates the motor 20 with the carrier 28 and motor brake 30 exploded. The motor 20 includes a motor shaft 22 that extends through the carrier 28 and the motor brake 30 to the housing 31, which is also the rotor 32. The housing 31 covers a friction pad 50, contact pad 40, and electromagnet 35. The electromagnet 35 includes a coil housing 37 with electrical coils 36 that are all located within a two piece concentrator 38.

Figure 8:
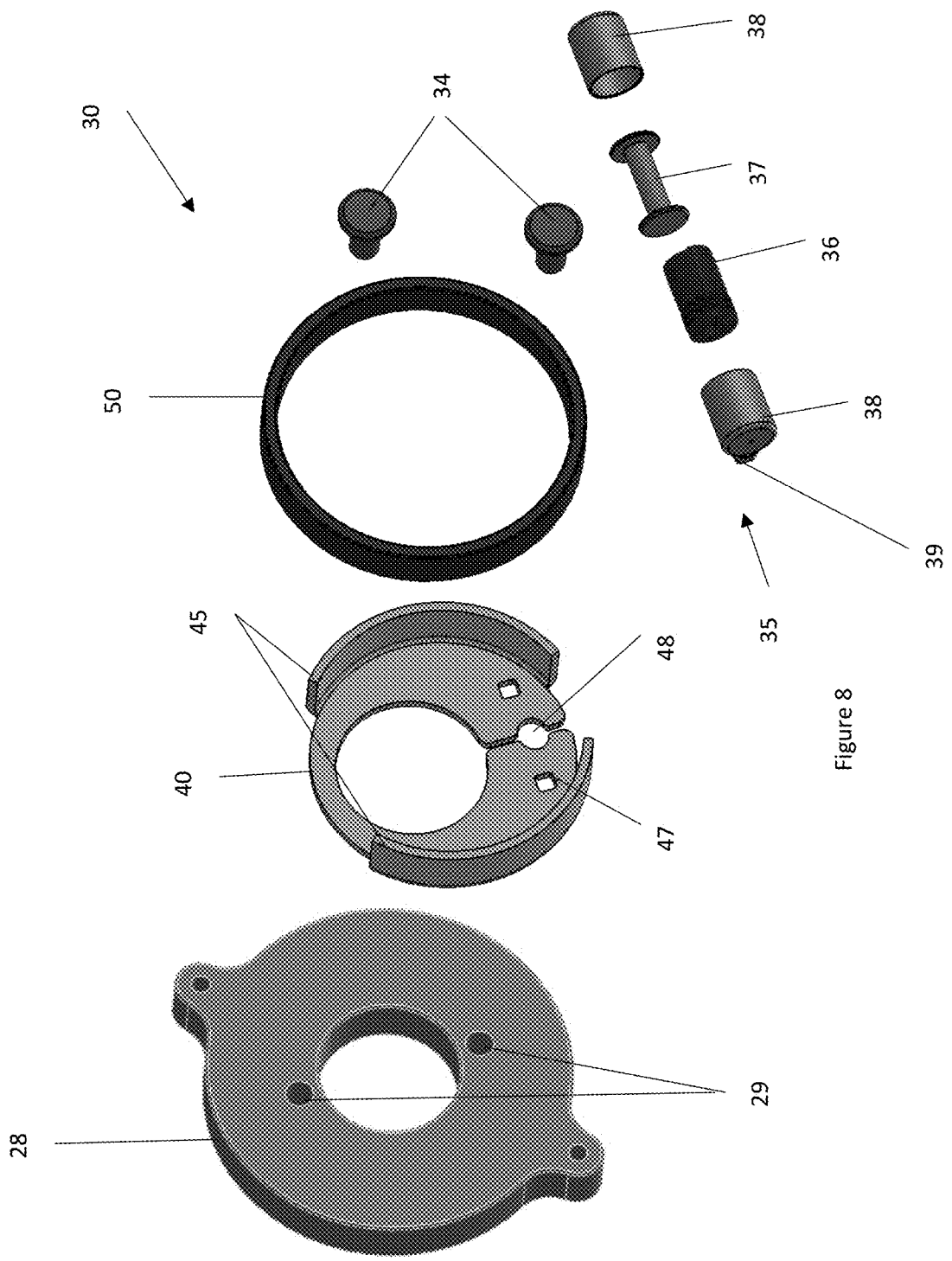
FIG. 8 is a partial explodes view of the motor brake of FIG. 7.

FIG. 8 illustrates an exploded view of a portion of a motor brake 30. The motor brake 30 is connected to the carrier 28 by abutment pins 34 that that extend into carrier recesses 29 within the carrier 28. The abutment pins 34 extend through the contact pad 40. The contact pad includes a pad recess 48 that receives an abutment pin 34 and a pair of pad apertures 47 that connect to legs 39 in the concentrator 38 of the electromagnet 35. The concentrator 38 extends around the electrical coils 36 that are wrapped around a coil housing 37. When the electromagnet 35 is activated the contact pad 40 is retracted away from the friction pad 50. When the electromagnet 35 is turned off the contact pad 40 moves the contact portion 45 into contact with the friction pad 50.

Figure 9A:
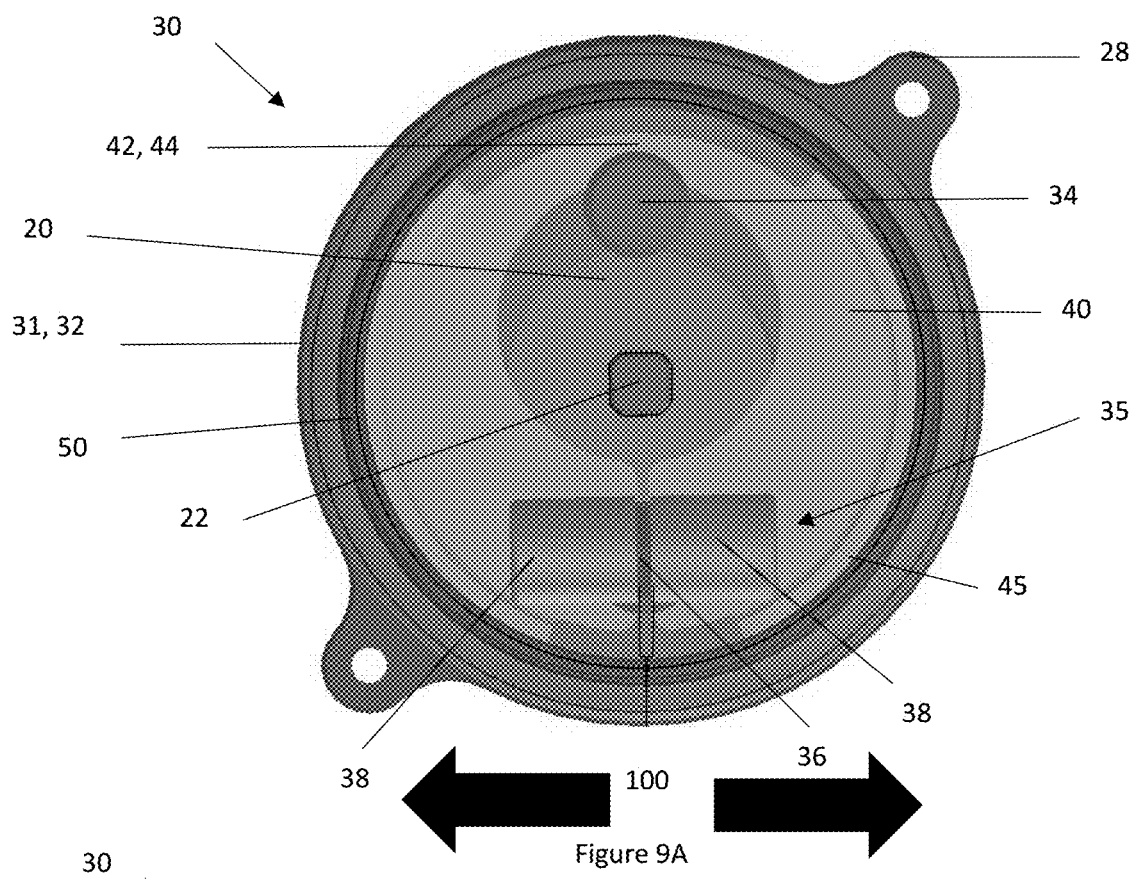

FIG. 9A illustrates a top view of the motor brake 30 in a brake on. The motor brake includes a housing 31, which is connected to a motor shaft 22 and acts as a rotor 32 (the rotor is shown in transparent). The rotor 32 is connected to the motor (not shown) by the motor shaft 22. A contact pad 40 is located within the housing 31 and the contact pad 40 is connected to the carrier 28 by abutment pins 34. The contact pad 40 in the brake on position moves the contact portion 45 into contact with the friction pads 50 within the rotor 32 so that movement of the rotor 32 is prevented. The contact pad 40 includes a grounding portion 44 that the abutment pins 34 extend past to connect the contact pad 40 to the motor 20. The contact pad 40 includes a springing portion 42 that spreads out the contact pad 40 and the concentrators 38 of the electromagnet 35 in the direction of the arrows so that a gap 100 is formed and the contact pad 40 is in contact with the rotor 32. Electrical coils 36 are visible in the gap 100 between the concentrators 38.

Figure 9B:
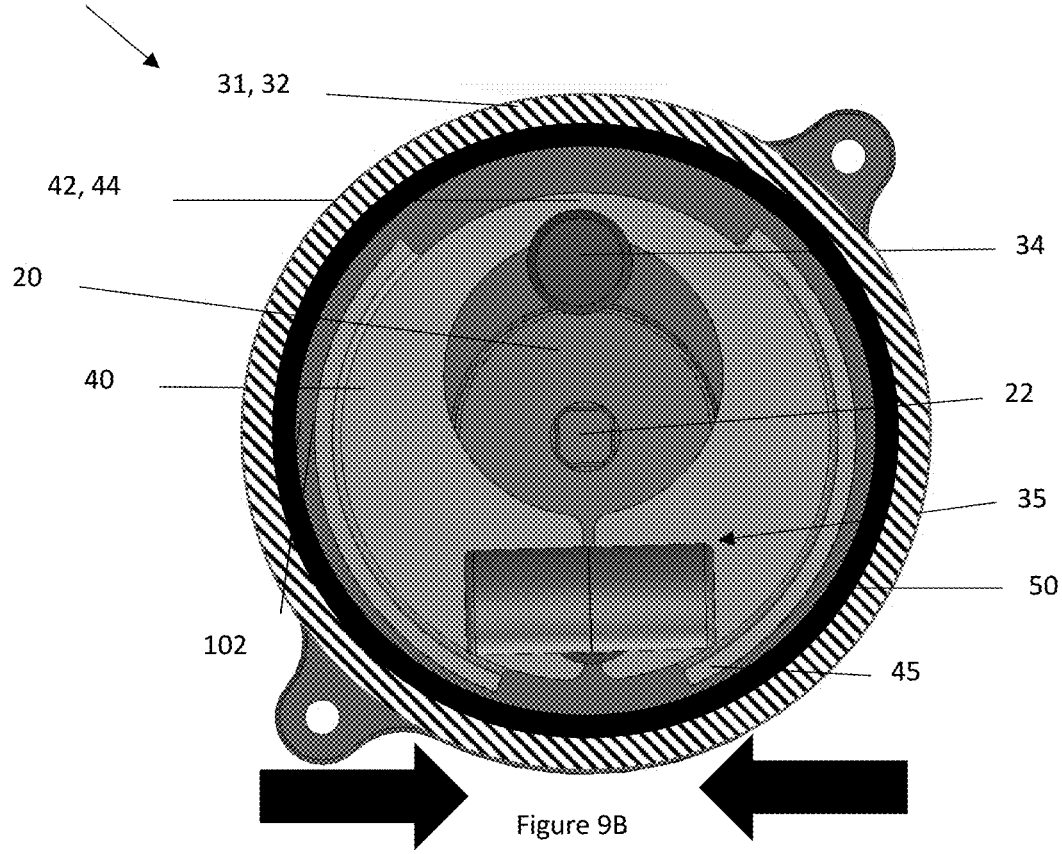
FIG. 9B is a top view of a motor brake with a brake release.

FIG. 9B illustrates a top view of the motor brake 30 in a brake release. The motor brake 30 includes a housing 31, which is connected to a motor shaft 22 and acts as a rotor 32. A gap 102 is located between the friction pad 50 of the rotor 32 and the contact portions 45 of the contact pad 40 so that no braking force acts (i.e., a brake retract is created) on the rotor 32 and the rotor 32 and motor 20 rotate freely. The contact pad 40 is grounded to the motor 20 by a pair of abutment pins 34. The abutment pins 34 are located near grounding portions 44 of the contact pad 40. The contact pad 40 also includes a springing portion 42 that biases the contact pad 40 outward. As shown the electromagnet 35 is powered so that electromagnet 35 moves together and overcomes the force of the springing portion 42 so that the gap 102 is created by moving the contact pad 40 in the direction of the arrows.

Figure 10:
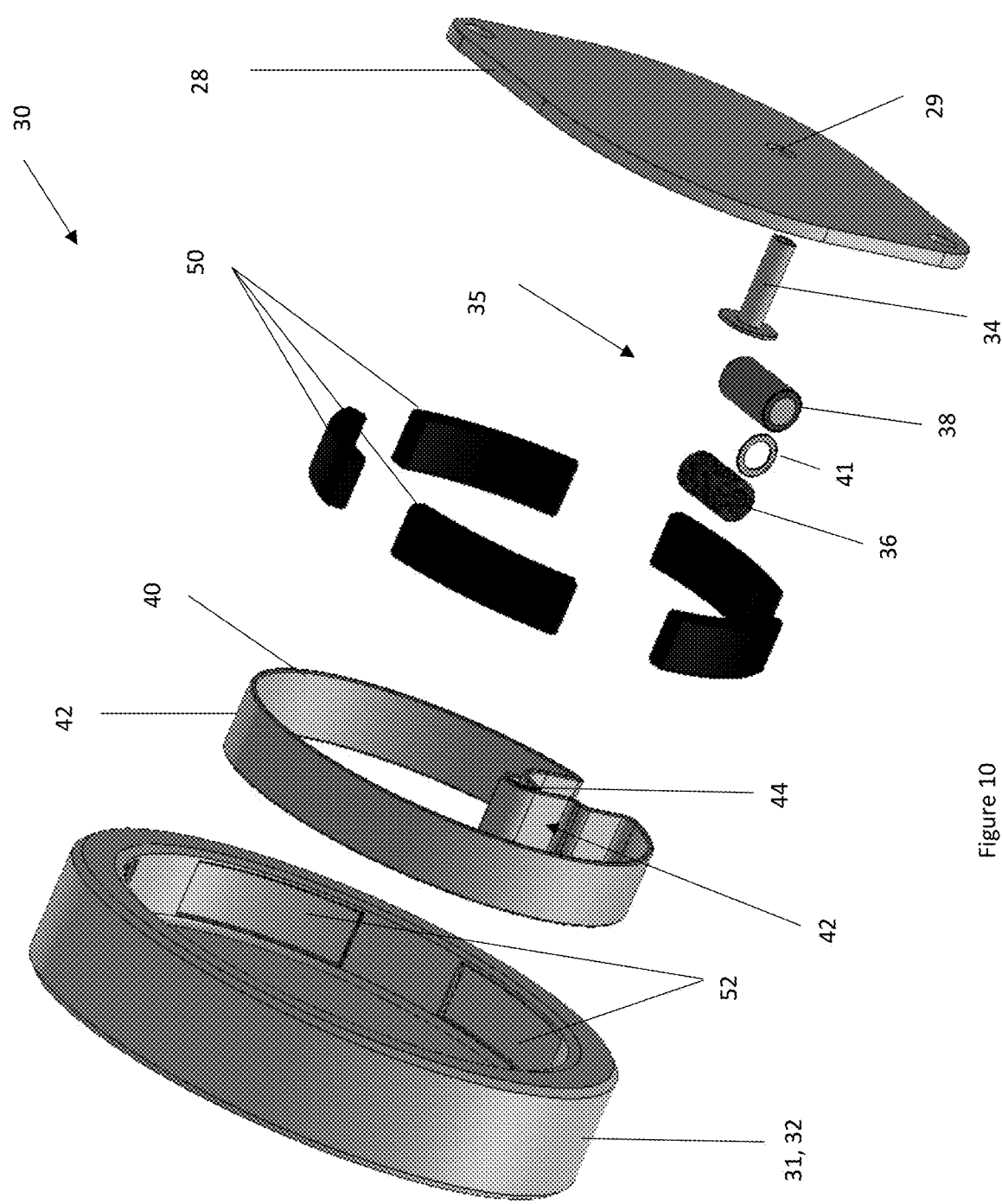
FIG. 10 is an exploded view of a motor brake.

FIG. 10 illustrates an exploded view of a motor brake 30. The motor brake 30 is connected to a carrier 28. The carrier 28 includes a carrier recess 29 that an abutment pin 34 is connected to so that the abutment pin 34 supports the contact pad 40 The contact pad 40 includes springing portions 42 around the circumference as well as a spring portion 42 that is located proximate to and contacts a grounding portion 44, which also receives the abutment pin 34. The contact pad 40 is in contact with an electromagnet 35 that moves the contact pad 40 when the electromagnet 35 is powered. The electromagnet 35 includes a concentrator 38 that houses electrical coils 36 and a cap 41. The contact pad 40 in a brake on position moves outward into contact with friction pads 50 that are located within housing recesses 52 within the housing 31.

Figure 11A:
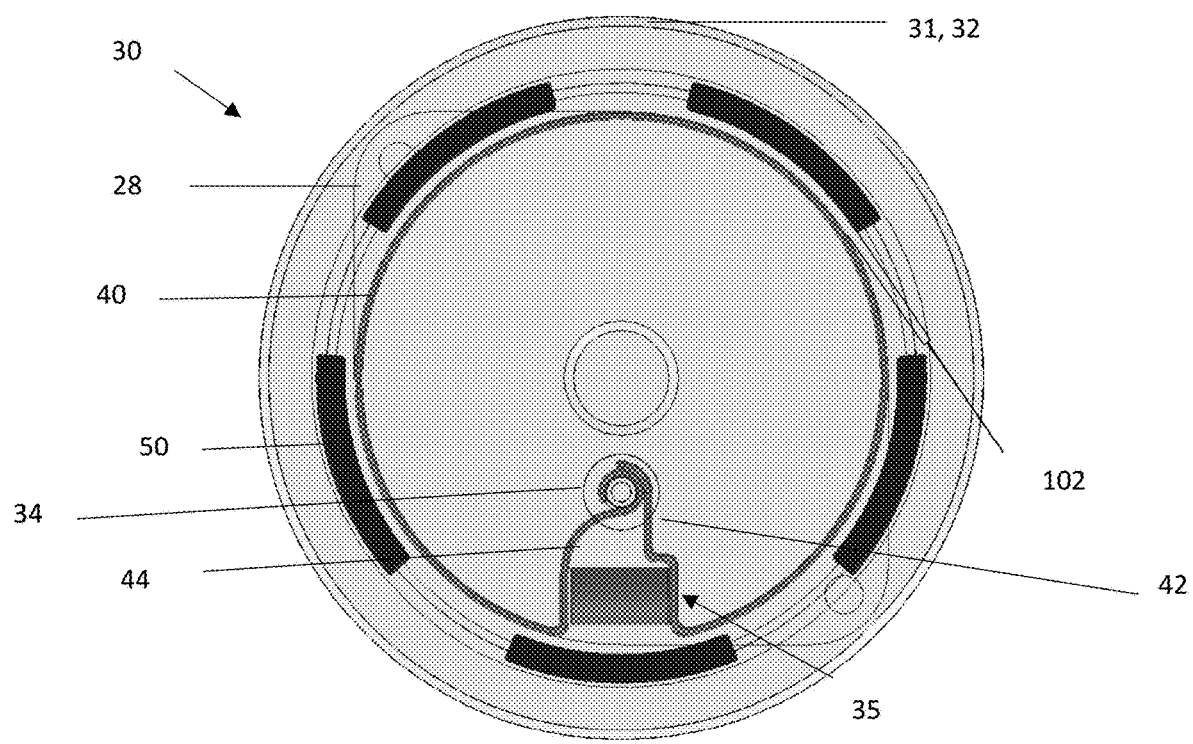
FIG. 11A is a top view of the motor brake with a brake release.

FIG. 11A illustrated a top view of the motor brake 30 with a housing 31 of the motor brake shown in transparent. The housing 31 is connected to a motor shaft (not shown) so that the housing 31 acts as a rotor 32. The rotor 31 includes a plurality of friction pads 50 that rotate with the housing 31 when a gap 102 is located between the friction pads 50 and the contact pad 40. The contact pad 40 is connected to the carrier 28 by an abutment pin 34. The abutment pin 34 is connected to a grounding portion 44 of the contact pad 40. The grounding portion 44 is in contact with a springing portion 42 that moves the contact pad 40 into contact with the friction pads 50 when the electromagnet 35 is off. The electromagnet 35 as shown is on so that the electromagnet overcomes the bias force of the springing portion 42 and the gap 102 is formed between the contact pad 40 and the friction pads 50.

Figure 11B:
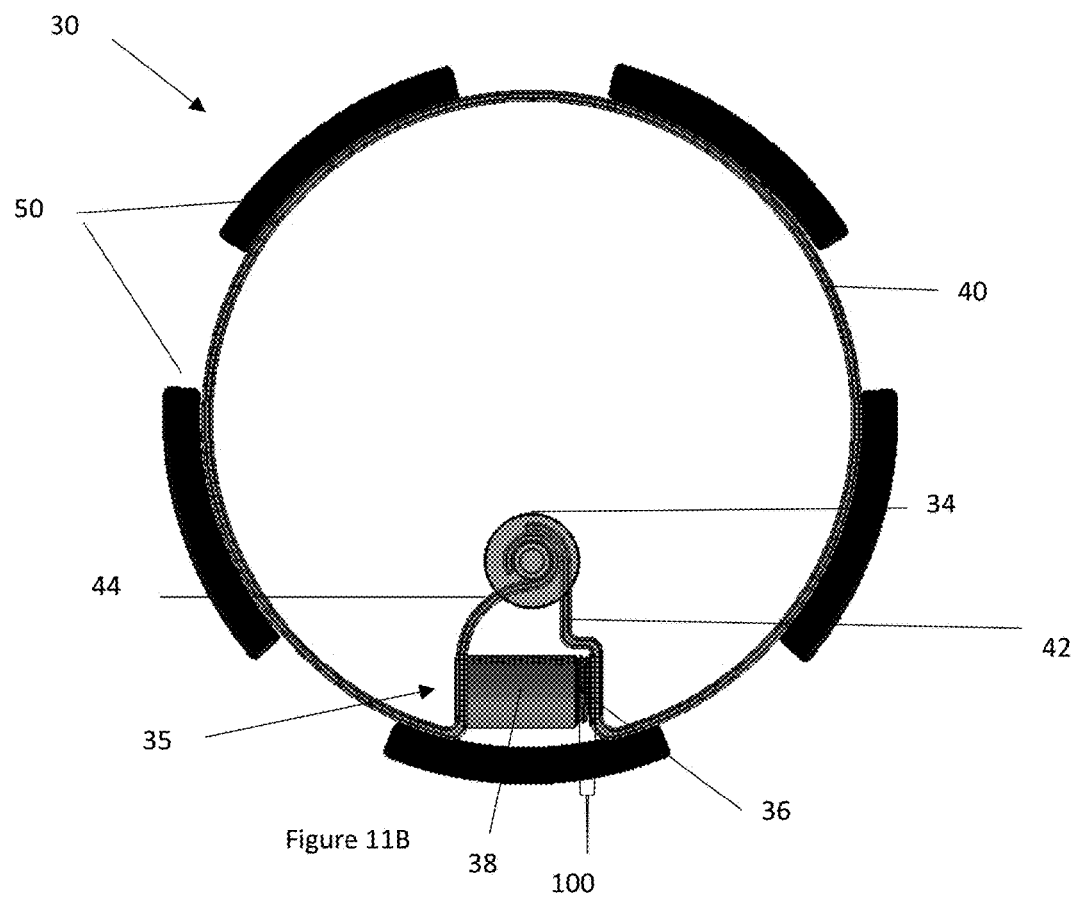

FIG. 11B illustrates a top view of the motor brake 30 with the housing removed. As shown the contact pad 40 is in contact with the friction pads 50 so that the brake is on. The springing portion 42 biases off of the grounding portion 44 and abutment pin 34 so that the electromagnet 35 is expanded an a gap 100 is formed between the concentrator 38 and the springing portion 42 so that the electrical coils 36 are located outside of the concentrator 38.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Brake Assembly
4 Motor Gear Unit
6 Caliper
8 Brake Pads
10 Piston
12 Piston Bore
14 Rotary to Linear Actuator
20 Motor
22 Motor Shaft
23 Wire
24 Abutment Recess
28 Carrier
29 Carrier Recess
30 Motor Brake
31 Housing
32 Rotor
33 Connection Key
34 Abutment Pins
35 Electromagnet
36 Electrical Coil
37 Coil housing
38 Concentrator
39 Leg
40 Contact Pad
41 Cap
42 Springing Portion
44 Grounding Portion
45 Contact portion
46 Moving Tab
47 Pad aperture
48 Pad Recess
50 Friction pad
52 Housing recess
100 Gap
102 Gap

We claim:

1. A motor brake assembly comprising:
A caliper including:
One or more pistons,
One or more rotary to linear actuators that provides an axial force to move the one or more pistons,
A motor gear unit in communication with the one or more rotary to linear actuators,
The motor gear unit including:
A motor and a motor brake that prevents movement of the motor gear unit, the one or more pistons, or both when the motor is turned off so that a brake application is maintained, the motor brake including:
a rotor that is in communication with the motor,
a ring-shaped contact pad that is positioned within the rotor, the contact pad is configured to flex and radially expand outward into contact with the rotor to prevent movement of the rotor and the motor, and an electromagnet that is in communication with the contact pas and creates a brake retraction.

2. The motor brake assembly of claim 1, wherein the electromagnet when activated flexes the contact pad out of contact with the rotor.

3. The motor brake assembly of claim 1, wherein the motor comprises an abutment recess, and the contact pad is connected to the motor via an abutment pin that engages the contact pad and the abutment recess.

4. The motor brake assembly of claim 1, wherein the contact pad is ring-shaped.

5. The motor brake assembly of claim 1, wherein the electromagnet when activated radially compresses the contact pad out of contact with the rotor.

6. The motor brake assembly of claim 1, wherein the electromagnet comprises a pair of concentrators and electrical coils disposed in a gap defined between the pair of concentrators.

7. The motor brake assembly of claim 6, wherein the pair of concentrators are connected to the contact pad.

8. The motor brake assembly of claim 7, wherein the contact pad comprises a pair of pad apertures that are each configured to receive a leg of one of the pair of concentrators.

9. The brake assembly of claim 1, wherein the motor brake comprises a friction pad disposed between the contact pad and the rotor.

10. The motor brake assembly of claim 9, wherein the friction pad is ring shaped.

11. The motor brake assembly of claim 9, wherein the friction pad comprises a plurality of discrete friction elements.

12. A motor comprising:
A motor shaft, and
A motor brake that is in communication with the motor shaft and prevents movement of the motor shaft when the motor is turned off so that movement of the motor shaft is prevented, the motor brake including:
A rotor that is in communication with the motor,
A ring-shaped contact pad that is configured to flex and expand radially outward into contact with the rotor to prevent movement of the rotor and the motor, and an electromagnet that is in communication with the contact pad and creates a brake retraction.

13. The motor of claim 12, wherein the contact pad directly contacts the rotor, and the rotor includes a friction pad and the contact pad contacts the friction pad.

14. The motor of claim 12, wherein the contact pad includes one or more grounding portions that are in communication with the motor or a carrier so that the contact pad is movable relative to the motor or the carrier but is connected to the motor or the carrier, and the one or more grounding portions are connected to the motor or the carrier by one or more abutment pins.

15. The motor of claim 12, wherein the contact pad is positioned inside of the rotor.

16. The motor of claim 15, wherein the electromagnet is positioning inside of the rotor.

17. The motor of claim 12, wherein the electromagnet when activated radially compresses the contact pad out of contact with the rotor.

18. The motor of claim 12, wherein the motor brake comprises a friction pad disposed between the contact pad and the rotor.

19. The motor of claim 18, wherein the friction pad is ring shaped.

20. The motor of claim 18, wherein the friction pad comprises a plurality of discrete friction elements.

* * * * *